Figure 2:
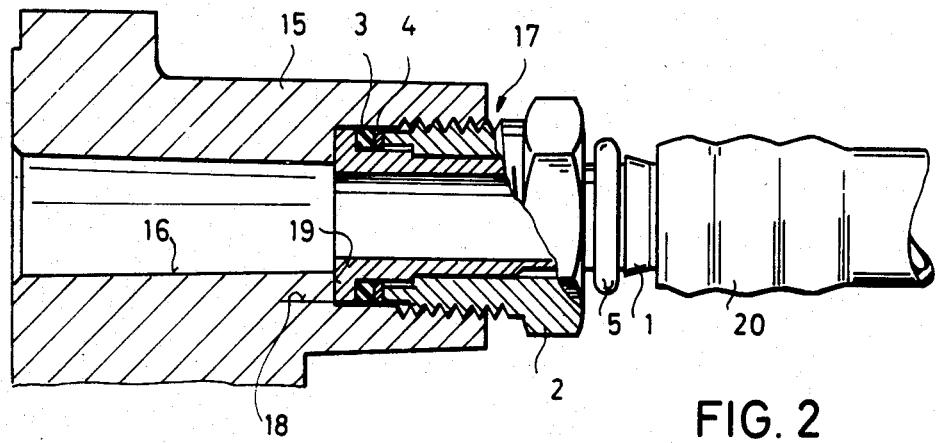

United States Patent [19]

Kelch

[11] Patent Number: 4,648,634
[45] Date of Patent: Mar. 10, 1987

[54] HOSE CONNECTION

[75] Inventor: Heinz Kelch, Königsfeld, Fed. Rep. of Germany

[73] Assignee: Mannesmann Kienzle GmbH, Fed. Rep. of Germany

[21] Appl. No.: 741,632

[22] Filed: Jun. 5, 1985

[30] Foreign Application Priority Data

Jun. 9, 1984 [DE] Fed. Rep. of Germany ....... 3421604

[51] Int. Cl.$^4$ .............................................. F16L 19/00
[52] U.S. Cl. ................................... 285/356; 285/393; 285/387
[58] Field of Search ............... 285/356, 353, 348, 387, 285/393

[56] References Cited

U.S. PATENT DOCUMENTS 731,348 6/1903 Eshelman ........................ 285/353 X
4,294,473 10/1981 Ekman ............................ 285/356 X

FOREIGN PATENT DOCUMENTS 132485 5/1949 Australia .............................. 285/353
2100065 7/1972 Fed. Rep. of Germany ...... 285/356
534772 3/1941 United Kingdom ................ 285/356
697495 9/1953 United Kingdom ................ 285/356

Primary Examiner—Richard J. Scanlan, Jr.
Attorney, Agent, or Firm—Toren, McGeady and Goldberg

[57] ABSTRACT

A hose connection, particularly for use in motor vehicles, is proposed which ensures a gastight connection already with a low starting torque, is usable repeatedly and whose structural component parts are non-detachably held together in an assembly unit. Supported on the shoulder (7) of a stepped hose sleeve (1), which shoulder (7) is smaller in diameter, is a hollow screw (2) which, when the hose connection is assembled at a rigid duct body (15), presses together a sealing ring (3), which is arranged on the shoulder (8) and has a larger diameter, only until the sealing ring (3) abuts at the end face (22) between the shoulders (7) and (8) of the hose sleeve (1).

4 Claims, 2 Drawing Figures

HOSE CONNECTION

The invention is directed to a hose connection comprising a hose sleeve assigned to a hose end and a hollow screw serving to connect the hose sleeve with a duct body of a fluid unit, which duct body is rigid per se.

In the previously conventional connecting means between rigid and flexible ducts of fluid circulation systems, designated in the following as hose connections, there is the risk, if its assembly is not effected with the utmost care, that it will have disturbance sources which in many cases are not promptly recognized as such. This is especially true in cases of use under extremely heavy-duty operating conditions, i.e., considerable operating temperature fluctuations and changes in viscosity of the flowing medium which are dependent on the latter, but also vibrations acting from the outside, as well as pressure shocks within the duct system such as are given, for example, in motor vehicles, construction and agricultural machinery.

Understandably, a relatively frequent separating and reconnecting of the respective hose connections is required precisely in the above-mentioned field of use because of maintenance operations, test runs or the exchange of fluid units, but this is often accompanied by unfavorable accessibility and an environment with an uncommonly high degree of dirt.

A first hose connection principle which can be applied under the aforementioned conditions provides for inseparably connecting the hose sleeve, which serves as a receptacle for the hose to be connected, with the respective fluid unit, for example, by means of soldering, and for pressing on the hose end during final assembly and possibly securing it in addition by means of a hose clamp. This solution has the advantage that the hose sleeve is non-detachably assigned to a rigid duct; however, aside from the fact that a bulky fluid unit results, this fastening is costly in terms of manufacturing technique and requires that there be sufficient room at the place of installation for the attachment of a hose. Moreover, a separating of this connection is not only complicated, but is practically impossible without destroying the hose end which is generally pressed on the hose sleeve so as to fit closely.

Another hose connection principle provides a hollow screw which is connectible with the fluid unit, a hollow ring carrying the hose sleeve being assigned to the shaft of the hollow screw and to the radial openings located in this shaft. Moreover, two preferably metallic sealing rings are required in the solution, which are to be arranged at both sides of the hollow ring on the shaft of the hollow screw during assembly. No doubt this solution provides the advantage of connecting the hose sleeve with a hose end away from the place of installation. However, the fact that the hose connection must be assembled only at the place of installation from a plurality of easily lost structural component parts makes its assembly extremely complicated and increases the risk that disturbances will occur, for example, if a structural component part falls and then is not carefully cleaned, especially since there are four gaps to seal. Moreover, in order to achieve an optimal sealing effect such a connection must be assembled with a work tool limiting the starting torque which, apart from the fact that new sealing disks must be employed during each repeated separation and connection of the hose connection, is often omitted during repairs. If leaks should occur because of this or if air is sucked in during low pressure in the respective fluid circulation considerable disturbances can occur, for example, when involving the injection circulation system of a diesel engine.

Therefore, it is the object of the present invention to provide a hose connection which permits an assembly which is simplified and requires less care, also during unfavorable installation situations, but which nevertheless avoids the disturbance sources mentioned above and provides a reliable functioning.

The solution, according to the invention, provides that the hose sleeve is stepped in such a way that a cylindrical portion of smaller diameter adjoins a cylindrical portion of larger diameter proceeding from the front side of the hose sleeve remote of the end on the hose side and that a sealing ring is assigned to the cylindrical portion of larger diameter, while the cylindrical portion of smaller diameter serves as support for the hollow screw.

The further advantageous construction of the invention follows from the subclaims.

With the newly found construction for a hose connection, which represents a decisive advantage, the sealing places are reduced on the one hand and, on the other hand, a reusability of the seal and, accordingly, of the entire hose connection is provided by means of limiting the compression stroke and accordingly the moment acting on the seal. Moreover, a sufficient sealing action can be achieved with the hose connection, according to the invention, already by means of tightening by hand, which is advantageous for testing purposes. Thus, the hose connection, according to the invention, is an assembly unit which is easy to handle and is producible as a marketable structural component. The reduction of susceptibility to disturbance and the ease of assembly understandably also influence the readiness to install fluid units in a motor vehicle which are not compulsorily required for the operation of the motor vehicle, for example, heat exchangers or flow meters. It is also noted that the hose connection, according to the invention, meets the demand for flow which is as free as possible from turbulence and can be used as a structural component part of a ball valve with appropriate countersinking of the hose sleeve.

Figure 1:
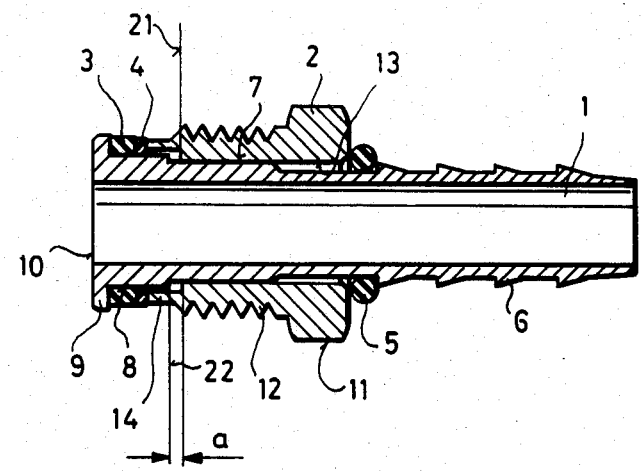

The invention is explained in the following in more detail with the aid of the enclosed drawing. Shown are:

FIG. 1 A section of the hose connection, according to the invention, preassembled as a marketable constructional unit.

FIG. 2 a section of the hose connection according to FIG. 1 in an assembled state.

As shown in FIG. 1, the hose connection, according to the invention, consists of a hose sleeve 1, a hollow screw 2 supported on the hose sleeve 1, a sealing ring 3 and a sliding disk 4. An O-ring 5 which is rolled onto the hose sleeve 1 serves to axially secure the hollow screw 2 on the hose sleeve 1 and to provide a construction or assembly unit. As can be seen in addition, a plurality of slide-on and retaining conical portions 6 assigned to a hose end to be pressed on, two cylindrical portions of different diameters 7 and 8, as well as a flange 9 forming the one front side 10 of the hose sleeve 1 are formed on the hose sleeve 1. The hollow screw 2 provided with a hexagon 11 and a fine thread 12 is rotatably supported with its borehole 13 on the cylindrical portion of smaller diameter 7 of the hose sleeve 1, while the sealing ring 3, for which the flange 9 in the one axial direction serves as a support, is arranged on the cylindrical shoulder 8 with a certain pretensioning. An annular shoulder 14, which is formed at the hollow screw 2 by means of countersinking the borehole 13, can, as shown, overlap the cylindrical shoulder 8 and act on the sliding disk 4 inserted between the sealing ring 3 and the hollow screw 2, because its inner diameter is somewhat greater than that of the cylindrical shoulder 8 of the hose sleeve 1.

As shown in FIG. 2, a countersinking 17 is formed concentrically relative to a duct 16 in a duct body 15 of a fluid unit, the cylindrical wall 18 of the countersinking 17 in part carrying an internal thread corresponding to the thread 12 of the hollow screw 2, and in part being constructed as a sealing surface assigned to the sealing ring 3, while the annular base surface 19 of the countersinking 17 serves the hose sleeve 1 as a stop face. If the hose connection, which is pressed onto a hose 20, is now fastened at the duct body 15, then, the hose sleeve 1 being supported at the base surface 19 of the countersinking 17, the hollow screw 2, which represents a substantial function of the newly found solution, can only be turned into the duct body 15 until the distance designated in FIG. 1 by a is zero, i.e., the ring surface 21 between the borehole 13 and the shoulder 14 abuts at the ring surface 22 between the shoulders 7 and 8 of the hose sleeve 1.

If the selected width of the sealing ring 3 is greater than the length of the shoulder 8 of the hose sleeve 1, then a manufacturing simplification can be achieved in that the flange 9 formed at the hose sleeve, as well as a stepped borehole in the hollow screw 2, can be dispensed with.

I claim:

1. Hose connection for connecting a hose to a rigid duct body of a fluid unit, comprising an axially elongated hose sleeve having an axially extending outer surface, an axially extending inner surface, a first end arranged to be seated in surface contact with the rigid duct body and a second end arranged to receive the hose, an axially extending hollow screw mounted on and encircling the outer surface of said hose sleeve, wherein the improvement comprises that the outer surface of said hose sleeve has a first axially extending cylindrical portion followed by a second axially extending cylindrical portion with said first cylindrical portion located closer to the first end of said hose sleeve, said first cylindrical portion having a larger diameter than said second cylindrical portion, a flange on the first end of said hose sleeve and extending between said first cylindrical portion and the first end and projecting radially outwardly from said first cylindrical portion with said flange forming an annular abutment surface facing said second end of said hose sleeve and extending radially outwardly from said first cylindrical portion, a sealing ring encircling said first cylindrical portion and arranged to bear against said abutment surface, said hollow screw having an inner surface and an outer surface extending in the axial direction thereof with the inner surface having a first axially extending cylindrical portion and a second axially extending cylindrical portion with the first cylindrical portion located closer to the first end of said hose sleeve than said second cylindrical portion, said first cylindrical portion of said hollow screw slides over said first cylindrical portion of said hose sleeve and said second cylindrical portion of said hollow screw is in sliding surface contact with said second cylindrical portion of said hose sleeve, the outer surface of said hollow screw is threaded for threaded engagement with the duct body, a first annular shoulder formed on said hose sleeve at the juncture of the first and second cylindrical portions thereof with said first annular shoulder extending radially outwardly from said second cylindrical portion to said first cylindrical portion of said hose sleeve, a second annular shoulder formed on said hollow screw at the juncture of the first and second cylindrical portions thereof with said second annular shoulder projecting radially outwardly from said second cylindrical portion to said first cylindrical portion of said hollow sleeve, said hollow sleeve having a first end and a second end with said first end forming the end of said first cylindrical portion of said hollow sleeve closer to said abutment surface on said flange, whereby said first annular shoulder forms a stop for said second annular shoulder as said hollow screw is threaded into the duct body and limits the pressing action as said first end of said hollow screw forces said sealing ring against said abutment surface on said flange.

2. Hose connection, as set forth in claim 1, wherein said first cylindrical portion of said hollow sleeve having a diameter slightly greater than the diameter of said first cylindrical portion of said hose sleeve.

3. Hose connection, as set forth in claim 1, wherein said hollow sleeve being slidable along said hose sleeve from the second end thereof toward the first end, and an O-ring engageable on the outer surface of said hose sleeve at the second end of said hollow screw for securing said hollow screw on said hose sleeve so that said hose sleeve and hollow screw along with said sealing ring form an assembly unit.

4. Hose connection, as set forth in claim 3, wherein an annular sliding disc is positioned between the sealing ring and the first end of said hollow screw.

* * * * *